Patented Apr. 17, 1934

1,954,936

UNITED STATES PATENT OFFICE 1,954,936

COLORING CERAMIC MATERIALS

Albert Lampe, Berlin-Grunewald, Germany, assignor to I. G. Farbenindustrie Aktiengesellschaft, Frankfort-on-the-Main, Germany No Drawing. Application August 25, 1933, Serial No. 686,856. In Germany November 11, 1929

4 Claims. (Cl. 25—157)

This invention relates to a process for coloring the surface of unglazed bricks, tiles, earthenware and the like articles.

The color of fired unglazed bricks and earthenware is dependent on mineral constituents contained in the ceramic material. In the absence of the desired coloring constituents in said ceramic materials, they may be incorporated mechanically in known manner. According to other known processes the raw ware is provided, prior to firing, with a coating of suitable composition, the so-called engobe or slip, the desired superficial coloration being thereby obtained on firing. These processes, however, are uneconomical, firstly because the added material has to be procured and, secondly, because the manual labor entailed considerably increases the cost of the product.

Processes are also known in which metallic oxides, with or without fluxes, are vaporized in the kiln or in special seggars during the firing process, in order to color the surface of the ceramic ware by this simple means. These processes, however, necessitate very high temperatures and are therefore applicable only to high-grade ceramic materials (porcelain) fired in seggars.

In another known process ferric chloride, in association with an equal quantity at least of sodium chloride, is employed for imparting a glossy, red-brown coloration to ceramic wares. In this process, however, the sodium chloride or the sodium oxide resulting from its decomposition, always forms, with the silicate of the ceramic ware, a salt glaze in the first place, said glaze being then colored by the other metallic chlorides jointly added, or the oxides resulting therefrom. This process furnishes a highly lustrous glaze, the formation of which may be undesirable when, as is the case at the present time, dull or matt colors are in vogue for bricks and earthenware—especially facing bricks—intended for building purposes. It has also been proposed to employ the vapors of manganese chloride, without addition of sodium chloride for deepening or masking the color of the material to be fired. In such cases, manganese chloride was introduced into the kiln, above the top layer of the fully heated charge, the vapors slowly liberated by the belt being drawn towards the lower layers by the draught of the kiln. In this process, however, extensive premature decomposition of the manganese chloride vapors is caused by the oxygen and moisture present in the kiln gases, so that said vapors are very imperfectly utilized. The decomposition of metallic chloride vapors from the liquid phase (melt) is, however, not contemplated by the present invention.

The present invention is based on the production, as a novel effect, of matt colorings on fired bricks, tiles, earthenware and the like articles, without the formation of the glaze hitherto regarded as necessary, by introducing into the kiln, during the firing process, metallic chlorides, such as ferric chloride and aluminium chloride, which readily sublime at temperatures below those obtaining in the ordinary firing process, and therefore disperse very quickly through the kiln and do not undergo any premature decomposition by the kiln gases. When these vapors in a sufficiently heated condition encounter the charge material, decomposition occurs accompanied by deposition and fixation of the corresponding oxides, so that the surface of the charge material acquires a different color.

The process of the present invention accordingly comprises introducing one of the aforesaid metallic chlorides into the kiln, without the customary addition of alkali chloride, during the firing process, effecting the sublimation of said chloride and causing it to enter, by conversion into a colored metallic oxide, into permanent combination with the surface of the ceramic ware. According to the invention, given suitably elevated temperature and suitable ceramic material, a colored sintered surface can also be formed, but not, in any circumstances, a colored salt glaze, since no alkali chlorides are introduced.

In the case of facing bricks particularly, modern taste even prefers diversity of color for the individual bricks. This also can be easily obtained, according to the invention, by irregularly distributing the subliming chlorides introduced into the kiln, and thus producing a coloration of varying intensity by the prolonged or repeated action of the vapors.

The production of red to iron-blue facing bricks from a clay or loam that does not turn red during firing, will now be described as a typical application of the present process. The bricks, shaped in the usual manner, are placed in the annular or chamber kiln. During the firing process an experimentally predetermined amount of anhydrous ferric chloride is introduced into the kiln, through the feed holes or in some other suitable way, the chloride subliming and becoming deposited on the brick charge. 5 to 10 kg $FeCl_3$ are sufficient for a charge comprising 1000 bricks of normal size (25 cm. x 12.5 cm. x 6 cm.). In the course of the firing process, carried out at about 900° C. or a somewhat higher temperature, the ferric chloride (which, however, may also contain a little ferrous chloride) is converted into ferric oxide and, as such, enters into combination with the silicon in the clay, thereby coloring the surface layer thereof. The intensity of the coloration depends on the amount of ferric chloride employed. If the ferric chloride be not uniformly distributed through the kiln, an irregular coloration is imparted to the charge. If, in the case of suitable material, the firing be prolonged at a higher temperature, a colored sintered surface is produced, which is also less glossy than a glazed colored surface. If the firing be continued with exclusion of air, and at a modified temperature if desired, a bluish tinge, corresponding to the degree of reduction, is imparted to the color. Similarly, the action of aluminium chloride—which sublimes with particular ease—produces a change in the color of the charge materials, which it makes lighter, since, in the main, alumina—partly in combination with the ceramic material ($SiO_2$, $CaO$)—is deposited on the surface. Colors with a greenish tinge,—such as olive brown—can be obtained with the vapors of sublimed chromium chloride, but in this case, by reason of the higher temperature of sublimation, it is advisable to preheat the receptacle containing the chromium chloride well before introducing it into the kiln, in order to accelerate the sublimation.

In order to obtain approximately uniform distribution of the sublimate in the kiln, it may also be volatilized on a plurality of plates or the like, suspended, at different levels, in shafts, or the chloride may be volatilized, in a retort or the like, outside the kiln, the sublimate being blown into the latter.

What I claim is:—

1. Process for coloring ceramic material which consists in firing the same in an atmosphere containing as the vapor of a sublimable metal chloride only the vapor of a metal chloride of the group consisting of ferric chloride, aluminum chloride and chromium chloride, whereby the said metal chloride contacts with the ceramic material and decomposes thereby depositing and fixing the corresponding metal oxid upon the surface of the ceramic material.

2. Process as defined in claim 1 in which the sublimable metal chloride is introduced into the kiln during the firing of the ceramic material at a temperature at which said metal chloride is volatilized.

3. Process as defined in claim 1 in which the ceramic material is irregularly colored by irregularly distributing the sublimable metal chloride through the kiln during the firing of the ceramic material at a temperature at which said metal chloride is volatilized.

4. Process as defined in claim 1 in which following the firing of the ceramic material in the presence of the volatilized metal chloride, the ceramic material is fired in a reducing atmosphere.

ALBERT LAMPE.